United States Patent
Mohammed et al.

(10) Patent No.: US 12,168,936 B2
(45) Date of Patent: Dec. 17, 2024

(54) METHOD AND SYSTEM FOR DE-PRIMING AN AIRCRAFT ENGINE COMPONENT CONTAINING A FLAMMABLE FLUID FOR FIRE SAFETY

(71) Applicant: PRATT & WHITNEY CANADA CORP., Longueuil (CA)

(72) Inventors: Kashif Mohammed, Brossard (CA); John Sgouromitis, Dorval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/186,347

(22) Filed: Mar. 20, 2023

(65) Prior Publication Data

US 2024/0318575 A1 Sep. 26, 2024

(51) Int. Cl.
*F01D 21/14* (2006.01)
*F01D 19/00* (2006.01)
(Continued)

(52) U.S. Cl.
CPC ............ *F01D 21/14* (2013.01); *F01D 19/00* (2013.01); *F01D 19/02* (2013.01); *F01D 21/12* (2013.01); *F01D 25/12* (2013.01); *F01D 25/125* (2013.01); *F01D 25/18* (2013.01); *F01D 25/20* (2013.01); *F01D 25/22* (2013.01); *F01M 1/18* (2013.01);
(Continued)

(58) Field of Classification Search
CPC ............ F01M 2011/0466; F01M 1/18; F01M 11/0458; F01M 11/0466; F01M 11/10; F02B 39/16; F02C 7/14; F02C 7/185; F05D 2270/3032; F05D 2270/303; F05D 2260/20; F05D 2260/213; F05D 2260/60; F05D 2260/605; F05D 2260/608; F05D 2260/98; F01D 21/12; F01D 21/14; F01D 19/00;
(Continued)

(56) References Cited

U.S. PATENT DOCUMENTS

| 4,452,037 A * | 6/1984 | Waddington ............ F01D 25/18 60/39.08 |
| 5,284,012 A | 2/1994 | Laborie et al. |

(Continued)

FOREIGN PATENT DOCUMENTS

DE 10205518 9/2002

*Primary Examiner* — Kyle Robert Thomas
(74) *Attorney, Agent, or Firm* — NORTON ROSE FULBRIGHT CANADA LLP

(57) ABSTRACT

An aircraft engine, has: an oil system, a component containing a baseline volume of oil during normal operation greater than a maximum volume of the oil for compliance with fire resistance requirements, the oil system having: an oil circuit, a de-priming port fluidly connected to a fluid source at a pressure sufficient to overcome a pressure drop through the component to drain the component to a volume of oil less than the maximum volume of the oil for compliance with the fire resistance requirements, and a valve connected to the de-priming port, the valve having a closed configuration preventing the fluid from entering the oil circuit and an open configuration permitting the fluid to enter the oil circuit via the de-priming port and through the valve, the valve movable from the closed configuration to the open configuration in response to the component being subjected to a fire event.

20 Claims, 5 Drawing Sheets

(51) Int. Cl.
*F01D 19/02* (2006.01)
*F01D 21/12* (2006.01)
*F01D 25/12* (2006.01)
*F01D 25/18* (2006.01)
*F01D 25/20* (2006.01)
*F01D 25/22* (2006.01)
*F01M 1/18* (2006.01)
*F01M 11/04* (2006.01)
*F01M 11/10* (2006.01)

(52) U.S. Cl.
CPC ......... *F01M 11/0458* (2013.01); *F01M 11/10* (2013.01); *F01M 2011/0466* (2013.01); *F05D 2260/98* (2013.01)

(58) Field of Classification Search
CPC ........ F01D 19/02; F01D 25/12; F01D 25/125; F01D 25/18; F01D 25/20; F01D 25/22
See application file for complete search history.

(56) References Cited

U.S. PATENT DOCUMENTS

| | | |
|---|---|---|
| 9,404,424 B2 | 8/2016 | Morawski et al. |
| 9,890,868 B2 | 2/2018 | Diaz et al. |
| 10,898,743 B2 | 1/2021 | Wright |
| 2018/0163966 A1 | 6/2018 | Jones et al. |
| 2018/0283283 A1* | 10/2018 | Manoukian ............... F02C 9/00 |

\* cited by examiner

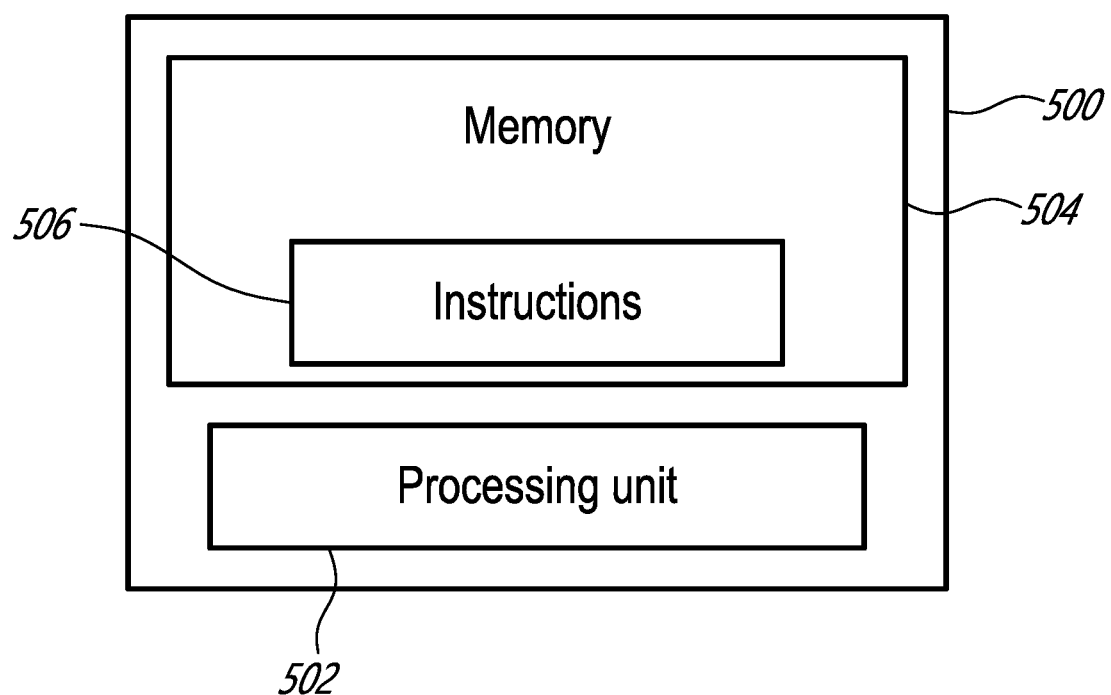

METHOD AND SYSTEM FOR DE-PRIMING AN AIRCRAFT ENGINE COMPONENT CONTAINING A FLAMMABLE FLUID FOR FIRE SAFETY

TECHNICAL FIELD

The application relates generally to aircraft engines and to fluid systems of such engines and, more particularly, to systems and methods of operating these components for compliance with fire safety regulations.

BACKGROUND

Aircraft components may be fire resistant or fireproof. According to airworthiness regulations, fire resistance requires the component to operate in a fire condition for five minutes while fireproof requires the component to comply with the fire resistance requirement and then to not leak a hazardous amount of a flammable fluid for an additional ten minutes. Making a component fireproof as opposed to fire resistant leads to increased cost, size, weight, and complexity. It may therefore be desirable to find ways to allow the use of a fire resistant component as opposed to a fireproof version of this same component.

SUMMARY

In one aspect, there is provided an aircraft engine, comprising: an oil system for distributing oil to a plurality of components, a component of the plurality of components containing a baseline volume of oil during normal operation, the baseline volume of the oil being greater than a maximum volume of the oil for compliance with fire resistance requirements, the oil system having: an oil circuit hydraulically connecting the plurality of components to an oil source, a de-priming port in the oil circuit, the de-priming port fluidly connected to a fluid source, the fluid source being at a pressure sufficient to overcome a pressure drop through the component to drain the component to a volume of oil less than the maximum volume of the oil for compliance with the fire resistance requirements, and a valve hydraulically connected to the oil circuit at the de-priming port, the valve having a closed configuration preventing a fluid of the fluid source from entering the oil circuit and an open configuration permitting the fluid to enter the oil circuit via the de-priming port and through the valve, the valve movable from the closed configuration to the open configuration in response to the component being subjected to a fire event.

The aircraft engine described above may include any of the following features, in any combinations.

In some embodiments, the de-priming port is located at a higher elevation than the component.

In some embodiments, the fluid source corresponds to an enclosure of the aircraft engine containing air.

In some embodiments, the fluid source is a tank containing a pressurized gas.

In some embodiments, the fluid source is connected to a compressor section of the aircraft engine.

In some embodiments, the valve is a thermostatic valve being in the closed configuration if a temperature of the oil is below a temperature threshold and in the open configuration if the temperature of the oil is above the temperature threshold, the temperature threshold being above a maximum operating temperature of the oil.

In some embodiments, the valve is an actuated valve, a controller operatively connected to the actuated valve, the controller having a processing unit and a computer-readable medium operatively connected to the processing unit and having instructions stored thereon executable by the processing unit for: receiving a signal indicative of a fire event; and moving the actuated valve from the closed configuration to the open configuration.

In some embodiments, the computer-readable medium further contains instructions for: receiving a second signal indicative that the aircraft engine is shut down, the moving of the actuated valve performed after the receiving of the second signal.

In some embodiments, the receiving of the signal indicative of the fire event includes receiving the signal from a sensor, the signal indicative that a temperature proximate the component is above a temperature threshold.

In some embodiments, the component is one or more of an air-cooled oil cooler, a fuel-oil heat exchanger, an actuator, and a generator.

In another aspect, there is provided a method of de-priming an aircraft engine component from a flammable fluid, comprising: determining that the component is subjected to a fire event, the component containing a baseline volume of the flammable fluid, the baseline volume of the flammable fluid being greater than a maximum volume of the flammable fluid for compliance with fire resistance requirements; fluidly connecting the component with a fluid source being at a pressure sufficient to overcome a pressure drop through the component; and draining a volume of the flammable fluid out of the component with the fluid source, the volume of the flammable fluid corresponding to at least a difference between the baseline volume of the flammable fluid and the maximum volume of the flammable fluid for compliance with the fire resistance requirements.

The method described above may include any of the following features, in any combinations.

In some embodiments, the fluidly connecting of the component with the fluid source includes fluidly connecting the component with a de-priming port in a circuit hydraulically connected to the component.

In some embodiments, the fluidly connecting of the component with the de-priming port includes fluidly connecting the component with the de-priming port being at a higher elevation than the component.

In some embodiments, the fluidly connecting of the component with the fluid source includes fluidly connecting the component with an enclosure of the aircraft engine, the enclosure containing a volume of air.

In some embodiments, the fluidly connecting of the component with the fluid source includes fluidly connecting the component with a compressor of the aircraft engine.

In some embodiments, the fluidly connecting of the component with the fluid source includes fluidly connecting the component with a tank containing a pressurized gas.

In some embodiments, the fluidly connecting of the component with the fluid source includes opening a valve thereby allowing the fluid to flow through the component.

In some embodiments, the valve is a thermostatic valve, the opening of the valve includes exposing the valve to a temperature above a temperature threshold, the temperature threshold being above a maximum operating temperature of the flammable fluid.

In some embodiments, the valve is an actuated valve, the opening of the valve includes: receiving a signal indicative of the fire event; and moving the actuated valve from a closed configuration to an open configuration.

In some embodiments, the method includes receiving a second signal indicative that the aircraft engine is shut down, the moving of the actuated valve performed after the receiving of the second signal.

BRIEF DESCRIPTION OF THE DRAWINGS

Reference is now made to the accompanying figures in which:

FIG. 5 is a schematic representation of a controller of the aircraft engine of FIG. 1.

DETAILED DESCRIPTION

Figure 1:
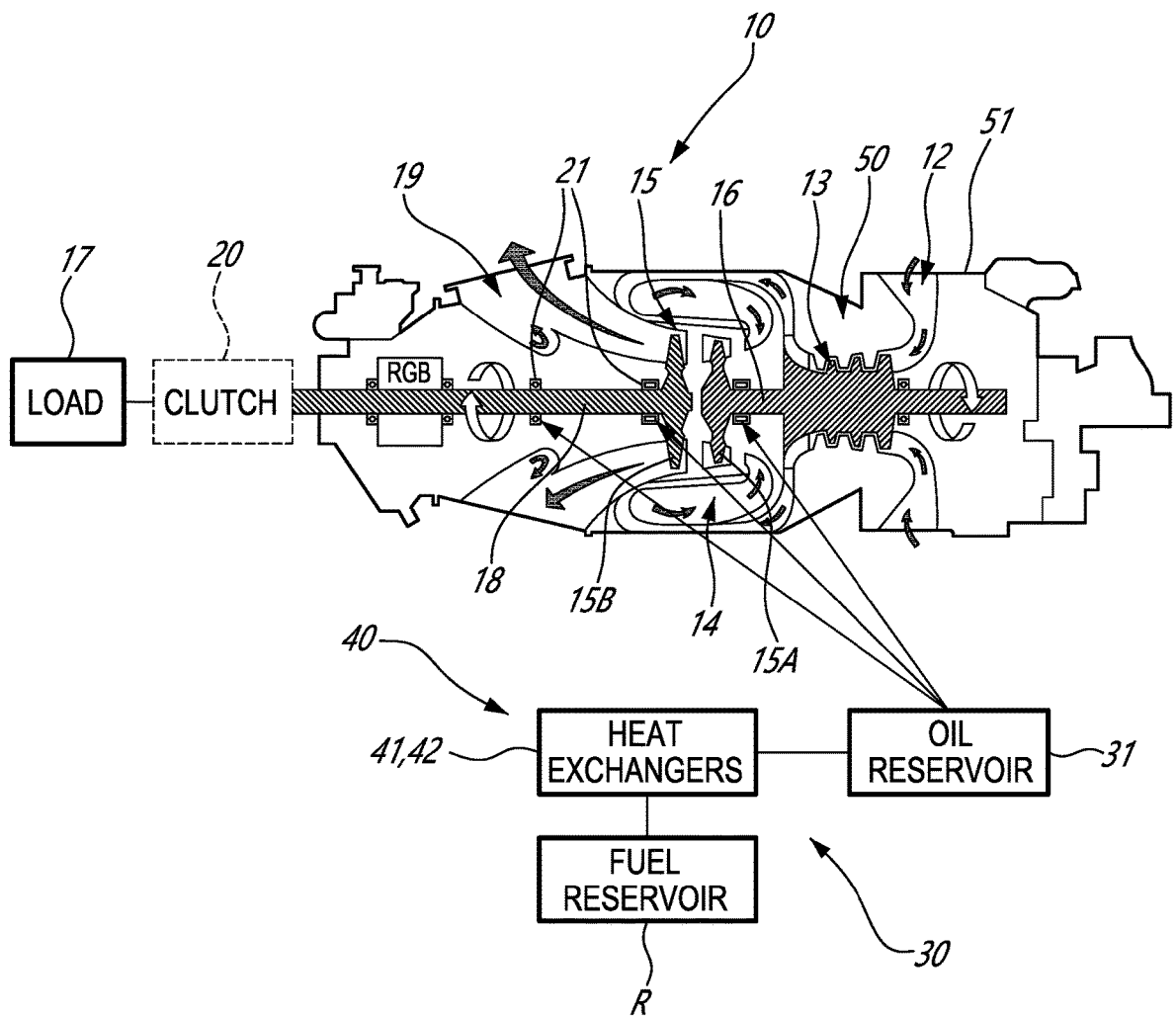
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a load 17, which may be a propeller, a helicopter rotor, and so on, via a low-pressure shaft 18. The low-pressure shaft 18 may be directly engaged to the load or, as shown herein, drivingly engaged to the load 17 via a reduction gearbox RGB. The gas turbine engine 10 has an exhaust 19 for expelling the combustion gases. Although the depicted gas turbine engine 10 is a turboprop or turboshaft engine, the present disclosure may apply to other engines, such as auxiliary power units (APU) and turbofans. In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18. In the embodiment shown, the load 17 is drivingly engaged to the low-pressure shaft 18 via a clutch 20 that has engaged and disengaged configurations to selectively disengage the load 17 from the low-pressure shaft 18. In the case of a turboshaft application, this clutch 20 may allow the disengagement of a helicopter rotor from the low-pressure shaft 18. In some applications, such as a turboprop, the clutch 20 may be omitted.

The low-pressure shaft 18 and the high-pressure shaft 16 are rollingly supported by bearings 21. Typically, the bearings 21 are contained within bearing cavities 22 (FIG. 2) that may be hydraulically connected to an oil source to receive oil for lubrication. An oil system 30 is provided for circulating oil to the bearings 26 and back to an oil source 31 (e.g., oil tank). The oil flowing through the oil system 30 is expected to see its temperature increase during use. It may therefore be required to cool down the oil. This may be done in many ways, for example, by transferring heat to ambient air of an environment outside the gas turbine engine 10 and/or to another fluid, such as the fuel.

In the embodiment shown, the gas turbine engine 10 has a heat exchange system 40 that is used to exchange heat between different fluids for proper operation of the gas turbine engine 10. In the present case, the heat exchange system 40 includes a first heat exchanger 41, which may be referred to as a air-cooled oil cooler (ACOC) used to transfer heat from the oil to the environment outside the gas turbine engine 10. The heat exchange system 40 further includes a second heat exchanger 42, which may be referred to as a fuel-oil heat exchanger (FOHE) used for transferring heat from the oil of the oil system 30 to fuel flowing from a fuel reservoir R, or any other fuel source, to the combustor 14 of the gas turbine engine 10 for combustion. Pre-heating the fuel as such may increase efficiency of the combustion of the fuel and may cool down the oil that heats up while lubricating the bearings 21. In some cases, the first heat exchanger 41 may be used to transfer or extract heat to/from an aircraft system in need.

Figure 2:
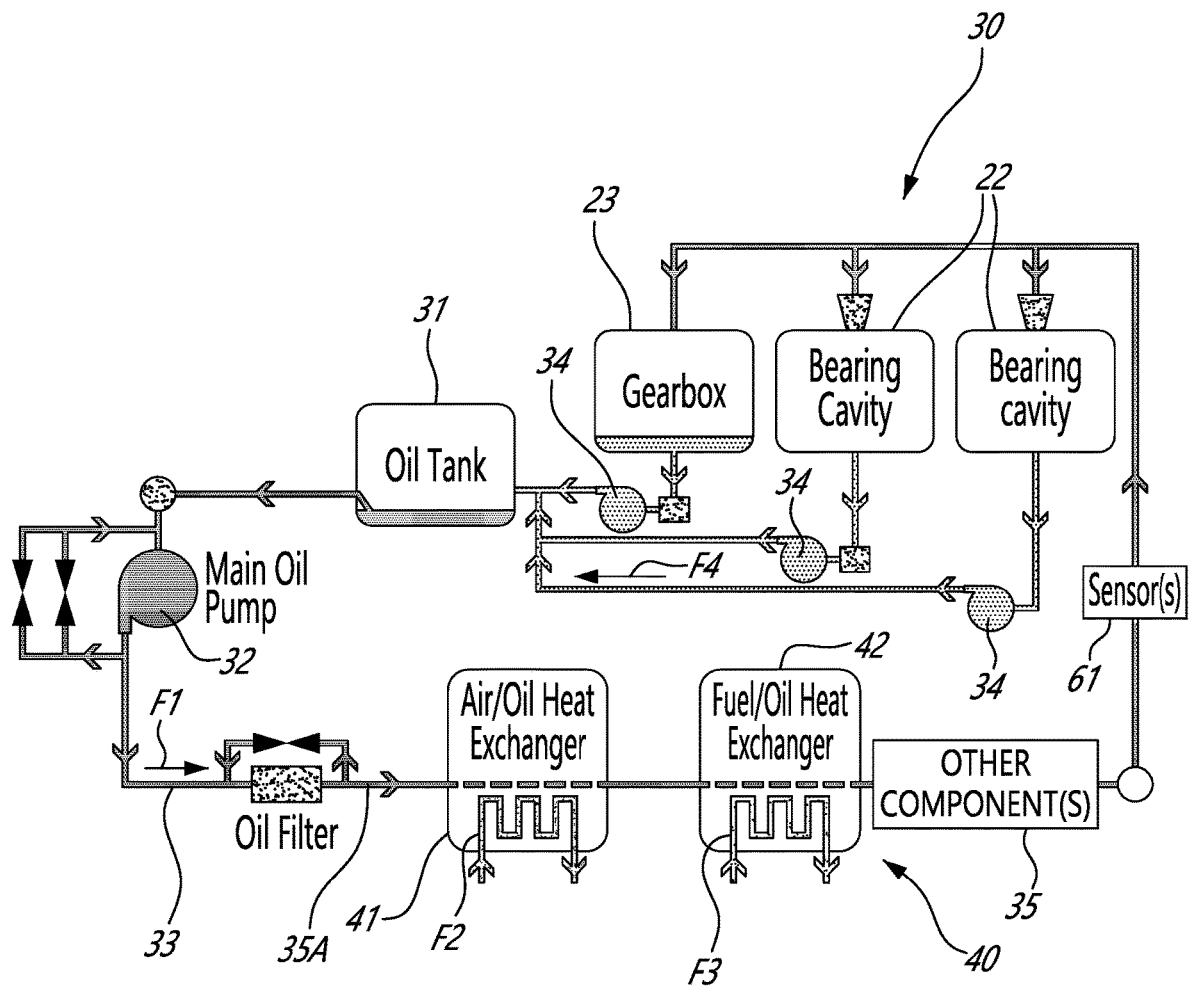
FIG. 2 is a schematic view of an oil system for the aircraft engine of FIG. 1.

Referring to FIG. 2, the oil system 30 and the heat exchange system 40 are shown in greater detail. The oil system 30 includes an oil circuit 33, which typically includes one or more lines to flow the oil, an oil pump 32 that drives an oil flow F1 within an oil conduit of the oil circuit 33 from the oil source 31. The oil system 30 may be a pressure regulated system in which a pressure regulating valve may be connected in parallel to the oil pump 32. The oil flow F1 exchanges heat with an airflow F2 from the environment through the first heat exchanger 41 and exchanges heat with a fuel flow F3 through the second heat exchanger 42. The oil flow F1 is then distributed between different components in need of oil. These components may include, for instance, one or more bearing cavity(ies) 22, a generator, an actuator, other accessory(ies) and/or a gearbox 23, which may correspond to the reduction gearbox of FIG. 1 or any other gearbox of the engine, in some embodiments. Used oil is then scavenged and scavenge pumps 34 drive a scavenge oil flow F4 from scavenge outlets of the bearing cavities 22 and the gearbox 23 back to the oil source 31 where the oil may be flown back to the oil pump 32. Typically, the oil tank has a volume devoid of oil (e.g., empty space containing air). During lubrication, the oil is expected to be mixed with air. Thus, the scavenge oil flow F4 is a multi-phase fluid containing oil and air. The oil may rest some time in the oil tank before being drawn by the pump 32. During this time, the air contained in the oil may naturally separate. A de-oiler and/or de-aerator may be used to accelerate the removal of air from the scavenge oil flow F4. It will be appreciated that many other configurations of the oil system 30 are contemplated. For instance, a different number of scavenge pumps may be used, some components may be omitted, and so on. An actuator may be fluidly connected to the oil conduit and may rely on oil pressure for its operation.

Aircraft engine components, such as the first heat exchanger 41 (i.e., ACOC), the second heat exchanger 42 (i.e., FOHE), other component(s) 35, the oil pump 32, the scavenge pump 34, the gearbox 23, and so on, may be required to meet either fire resistant or fireproof requirements. The other component(s) 35 may include, for instance, a generator, a gearbox, an actuator, and so on. To meet the fire resistant requirements, the component needs to operate in a fire condition for five minutes. To meet the fireproof requirements, the component needs to meet the fire resistant requirements and, in addition, not leak a hazardous amount of flammable fluid (e.g., oil, fuel) for an additional 10 minutes. Typically, an amount of flammable fluid is considered hazardous if it exceeds 250 millilitres.

In the context of the present disclosure, the fire proof and fire resistance requirements are in reference with Federal Aviation Administration (FAA) regulations. These requirements may vary depending on regulations of the countries in which the aircraft engine will be operated. In some cases, the fire proof and fire resistant regulations are defined by Article 533.17 of the Airworthiness Manual Chapter 533 of the Canadian Aviation Regulations (CARs). Alternatively, the "fireproof" and "fire resistant" definitions may be in conformance with the requirements set by any other national or international regulatory body, for example, the Federal Aviation Administration, the European Aviation Safety Agency, the Civil Aviation Administration of China, the Japan Civil Aviation Bureau, or the Russian Federal Agency for Air Transport to name a few.

If a fire event is detected, the gas turbine engine 10 may be shut down. To avoid wind milling, the load 17 (e.g., helicopter rotor) may be disengaged from the low-pressure shaft 18, herein by the clutch 20, to avoid the load from driving the oil pump 32 or other components, such as a fuel pump, since the oil pump 32 may be drivingly engaged by a shaft of the gas turbine engine 10. Therefore, by disconnecting the load 17 from the low-pressure shaft 18 and, hence, from the oil pump 32, the oil flow F1 may be stopped. This may thus prevent the oil pump 32 from feeding more oil on the fire. However, some components of the gas turbine engine 10 may still contain a hazardous volume of flammable fluid. These components are thus required to be fireproof, rather than fire resistant, to prevent the oil from leaking out and feeding the fire. However, making a component fireproof as opposed to fire resistant leads to increased cost, size, weight, and complexity. It may therefore be desirable to find ways to allow the use of a fire resistant component as opposed to a fireproof version of this same component.

The present disclosure describes a method of removing at least a portion of the oil or other fluid contained in a component in a fire event. In such a case, since the component contains less fluid than a hazardous volume, the component may be only required to comply with the fire resistant requirements rather than the fireproof requirements.

Figure 3:
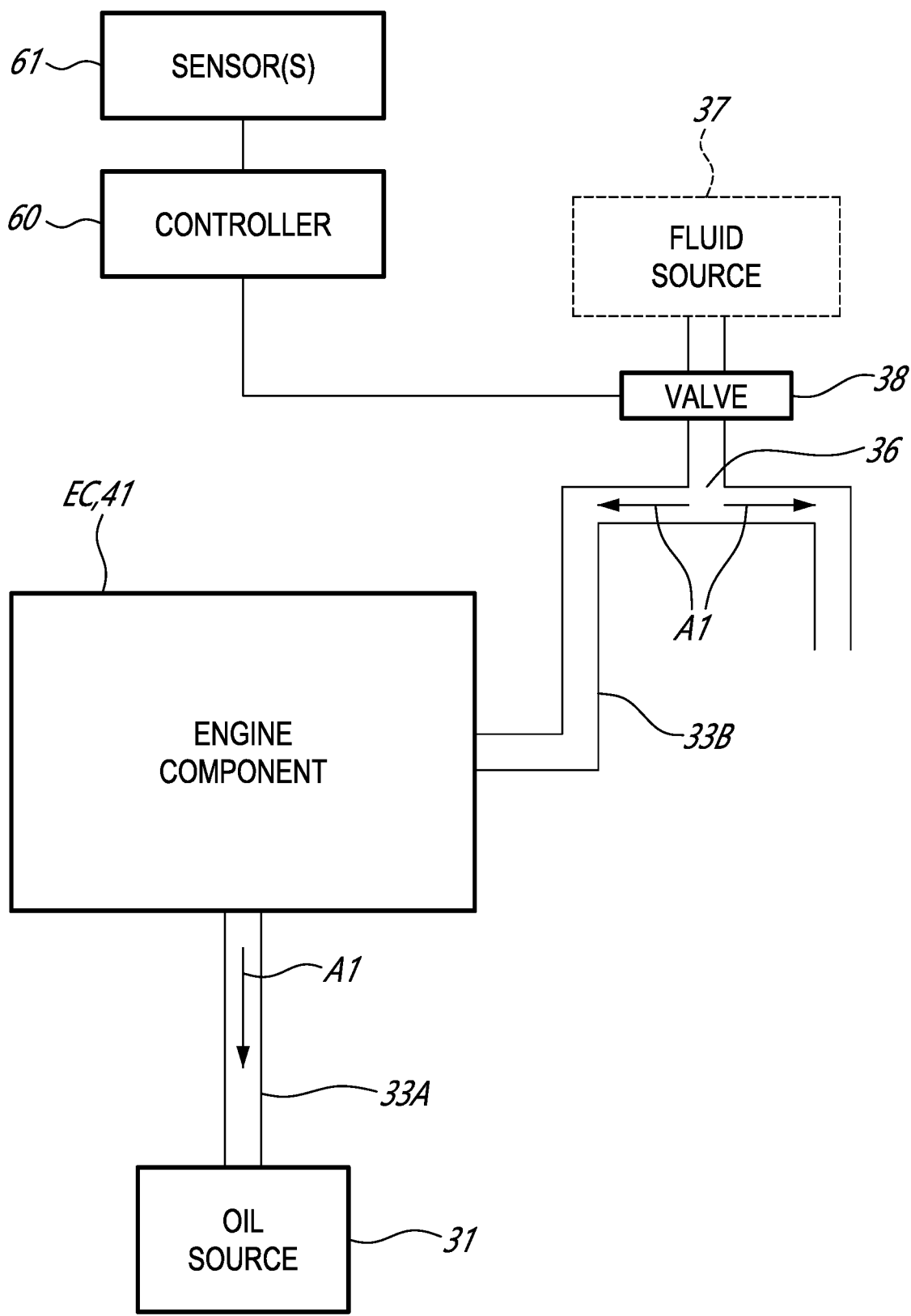
FIG. 3 is an enlarged view of a portion of the oil system of the aircraft engine of FIG. 1.

Referring now to FIG. 3, one of the components EC is illustrated. For the sake of clarity, the description below will refer to the first heat exchanger 41, which corresponds to the air-cooled oil cooler, as the engine component EC, but any other components listed above may benefit from the features of the present disclosure. Also, FIG. 3 pertains to an engine component of the oil system 30. However, the principles of the present disclosure are applicable to any fluid system of the gas turbine engine 10, such as a fuel system.

The first heat exchanger 41 contains a given volume of oil during normal operation. This oil is fed to the first heat exchanger 41 from the oil source 31 and via a first conduit 33A of the oil circuit 33. The oil then exits the first heat exchanger 41 via a second conduit 33B of the oil circuit 33. The oil may then flow back towards the oil source 31 either directly or through other components. During normal operation, that is, when the gas turbine engine 10 is running at nominal, the first heat exchanger 41 contains a baseline volume of oil. This baseline volume of oil is expected to be greater than a maximum volume of oil allowed for compliance with the fire resistance requirements. In other words, the fire resistance requirements may require that a component does not contain more than 250 ml of oil or other hazardous fluid. The baseline volume of oil is greater than 250 ml. Thus, in normal situations, the first heat exchanger 41 would be required to meet the fireproof requirements rather than the fire resistance requirements because of the volume of fluid it contains. This volume threshold may vary with regulatory body (e.g., FAA).

As shown in FIG. 3, the oil system 30 includes a de-priming port 36. This de-priming port 36 is herein located in the oil circuit 33, preferably in the second conduit 33B that flows oil outputted by the first heat exchanger 41. The de-priming port 36 may alternatively be a secondary port of the first heat exchanger 41, may alternatively be located on the first conduit 33A that flows oil towards an inlet of the first heat exchanger 41, or at any other suitable location. The de-priming port 36 is fluidly connected to a fluid source 37 being at a pressure sufficient to overcome a pressure drop through the first heat exchanger 41 to drain the first heat exchanger 41 from a volume of oil corresponding to at least a difference between the baseline volume of the oil and the maximum volume of the oil for compliance with the fire resistance requirements. In other words, the pressure is sufficient to overcome a pressure drop through the first heat exchanger 41 to drain the first heat exchanger 41 to a volume of oil less than the maximum volume of the oil for compliance with the fire resistance requirements.

A valve 38 is hydraulically connected to the oil circuit 33 at the de-priming port 36. The valve 38 has a closed configuration preventing a fluid of the fluid source 37 from entering the oil circuit 33 and an open configuration permitting the fluid to enter the oil circuit 33 via the de-priming port 36 and through the valve 38. The valve 38 is movable from the closed configuration to the open configuration in response to the first heat exchanger 41 being subjected to a fire event. The valve 38 may be an actuated valve (e.g., servo valve) operatively connected to a controller 60 operable to control the opening and closing of the valve 38. One or more sensor(s) 61 is operatively connected to the controller 60. The controller 60 may be configured for receiving a signal indicative of a fire event; and moving the actuated valve from the closed configuration to the open configuration. The receiving of the signal indicative of the fire event may include receiving the signal from the one or more sensor(s) 61. The signal may be indicative that a temperature proximate or within the first heat exchanger 41 is above a temperature threshold. The temperature threshold is set to be higher than a maximum operational temperature of the oil flowing through the first heat exchanger 41 and/or higher than a maximum temperature of ambient air around the first heat exchanger 41 such that the only reason for the temperature to reach this temperature threshold would be because of a fire event.

The one or more sensor(s) 61 may alternatively, or in combination, includes a pressure sensor, a smoke sensor, or any other sensor that may be used to detect a fire. In some embodiments, the sensor is operable to measure an operating parameter of the first heat exchanger 41 and to send a signal to the controller 60 should a value of this operating parameter exceeds a parameter threshold. The operating parameter may be the temperature of the oil, the temperature of ambient air around the first heat exchanger 41, the pressure of the oil inside the first heat exchanger, and so on. The one or more sensor(s) 61 and the controller 60 may be part of a fire detection system of the gas turbine engine 10.

In some embodiments, the controller 60 may be further configured to receive a second signal indicative that the gas turbine engine 10 is shut down to avoid draining the first heat exchanger 41 if the engine is still operating, and thus in need of cooling the oil. Thus, the moving of the actuated valve to the open configuration may be performed after the receiving of this second signal. The one or more sensor(s) 61 may thus include a sensor able to generate a signal indicative of whether or not the gas turbine engine 10 is operating. This sensor may be a speed sensor operatively connected to a shaft of the gas turbine engine 10. The gas turbine engine 10 may be considered shut down if a speed of the shaft measured by the speed sensor is below or at a certain value. Alternatively, a temperature sensor operatively connected to the combustor 14 (FIG. 1) may be used. The gas turbine engine 10 may be considered shut down if a temperature within the combustor 14 is below a given threshold.

In some embodiments, the valve 38 is a thermostatic valve being in the closed configuration if a temperature of the oil is below a temperature threshold and in the open configuration if the temperature of the oil is above the temperature threshold. The temperature threshold is above a maximum operating temperature of the oil as discussed above. The valve 38 may be a thermal fuse having a melting temperature above the maximum operating temperature of the oil.

When the valve is a passive valve, such as a thermostatic valve, it opens when the component is subjected to a fire event. A fire event is expected to increase a temperature of ambient air around the component and/or around the valve 38. In some cases, the increase in temperature of the ambient air around the component may result in an increase of the temperature of the fluid flowing through the component. This heated fluid may reach the valve thereby triggering its opening. In some other cases, ambient air around heated by the fire in the vicinity of the valve may be sufficient to trigger the opening of the valve. The valve may therefore be tuned to open when a temperature of either the fluid flowing through the system or the ambient air around the valve reaches a given temperature threshold that is above a maximum normal operating temperature of the ambient air or of the fluid.

Still referring to FIG. 3, in some embodiments, the fluid source 37 may correspond to a volume defined within an enclosure 50 (FIG. 1) of the gas turbine engine 10. This enclosure 50 may be located radially inwardly of a casing 51 of the gas turbine engine 10. This enclosure 50 may contain air at atmospheric pressure. Therefore, in some embodiments, simply opening the de-priming port 36 and exposing it to atmospheric pressure may allow air to enter the oil circuit 33 thereby replacing the oil, which may be drained. Preferably, in such a case, the de-priming port 36 is located at a higher elevation than the first heat exchanger 41 as illustrated in FIG. 3. The de-priming port 36 may thus be a vent; opening the oil circuit 33 to atmospheric pressure at the de-priming port 36 may allow the oil to flow along arrows A1 by gravity. Put differently, allowing ambient air to enter the oil circuit 33 at the de-priming port 36 may permit the oil to flow back towards the oil source 31 and/or flow out of the first heat exchanger 41 by gravity.

In some cases, gravity and atmospheric pressure may not be sufficient to overcome the pressure drop through the first heat exchanger 41. In such a case, the fluid source 37 may be a tank containing a pressurized gas (e.g., air, azote, argon, etc.). A pressure inside the tank would be tuned to overcome a pressure drop through the first heat exchanger 41 to drain the first heat exchanger 41 from a sufficient volume of oil for compliance with the fire resistance requirements.

In still another embodiment, the fluid source 37 may be the compressor section 13 of the gas turbine engine 10. A line may be provided to fluidly connect a bleed location on the compressor section 13 to the de-priming port 36. The bleed location would be selected to ensure that the air pressure at this bleed location is sufficient to overcome a pressure drop through the first heat exchanger 41 to drain the first heat exchanger 41 from a sufficient volume of oil for compliance with the fire resistance requirements.

Figure 4:
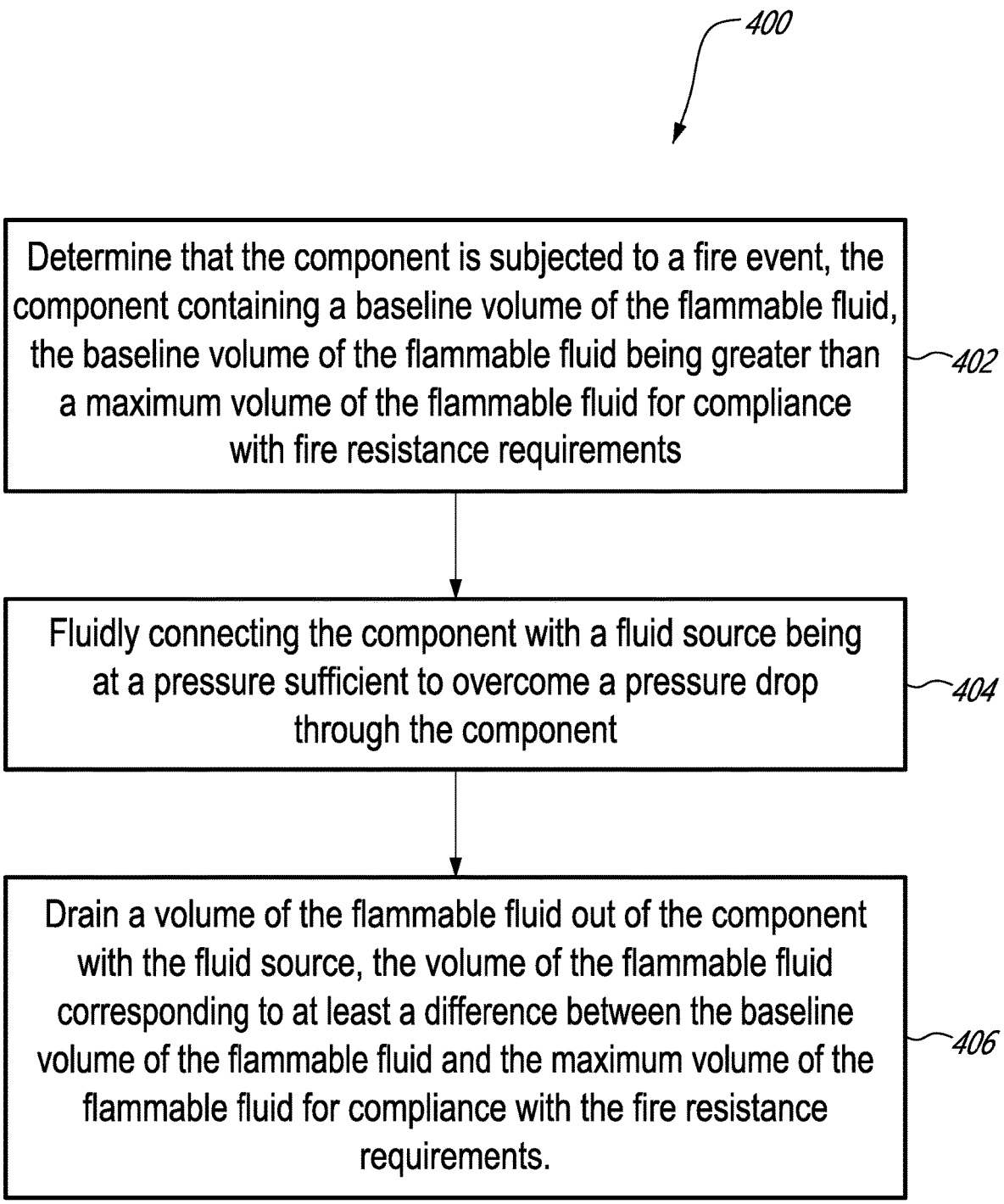
FIG. 4 is a flowchart illustrating steps of a method for de-priming a component of the oil system of FIG. 2.

Referring now to FIG. 4, a method of de-priming a component EC, such as the first heat exchanger 41, is presented at 400. The method 400 includes determining that the component is subjected to a fire event, the component containing a baseline volume of oil, the baseline volume of the oil being greater than a maximum volume of the oil for compliance with fire resistance requirements at 402; fluidly connecting the component with the fluid source 37 being at a pressure sufficient to overcome a pressure drop through the component at 404; and draining a volume of the oil out of the component with the fluid source, the volume of oil corresponding to at least a difference between the baseline volume of the oil and the maximum volume of the oil for compliance with the fire resistance requirements at 406.

In the embodiment shown, the fluidly connecting of the component with the fluid source 37 at 404 includes fluidly connecting the component with the de-priming port 36 in the oil circuit 33 hydraulically connected to the component. The fluidly connecting of the component with the de-priming port 36 may include fluidly connecting the component with the de-priming port 36 being at a higher elevation than the component as illustrated in FIG. 3. The fluidly connecting of the component with the fluid source at 404 may include fluidly connecting the component with the enclosure 50 containing a volume of air. The fluidly connecting of the component with the fluid source 37 may include fluidly connecting the component with the compressor section 13 of the gas turbine engine 10. The fluidly connecting of the component with the fluid source 37 may include fluidly connecting the component with the fluid source being a tank containing a pressurized gas.

In the embodiment shown, the fluidly connecting of the component with the fluid source 37 include opening the valve 38 thereby allowing the fluid to flow through the component. The valve 38 may be a thermostatic valve. The opening of the valve 38 may include exposing the valve to a temperature above a temperature threshold. The temperature threshold is above a maximum operating temperature of the oil.

Alternatively, the valve is an actuated valve. The opening of the valve may include receiving a signal indicative of the fire event; and moving the actuated valve from a closed configuration to an open configuration. A second signal indicative that the aircraft engine is shut down may be received. The moving of the actuated valve may be performed after the receiving of the second signal.

The present disclosure relates to a method of de-priming of component to remove a targeted amount of liquid. For fire safety, the component may not need to be completely drained. Only enough draining may be required such that a remaining volume of a hazardous fluid is less than a given threshold. For active de-priming, testing may be done to measure how much time is needed for the supply air to adequately remove the fluid volume. For pressurized passive, calculations may be done to balance the pressure differential between engine off and engine on condition, balanced with the air pressure in the reservoir, to calculate the reservoir volume. For non-pressurized passive, testing may be done to see how long a vent would have to be opened to allow for adequate drainage from the component to occur.

As shown in FIG. 3, by placing the fluid source 37 at the top of the circuit, the targeted component may be better isolated. If other tubes or engine components are placed at the same level or higher than the targeted component, that volume of fluid may also be drained back to the oil source 31.

With reference to FIG. 5, an example of a computing device 500 is illustrated. For simplicity only one computing device 500 is shown but the system may include more computing devices 500 operable to exchange data. The computing devices 500 may be the same or different types of devices. The controller 60 may be implemented with one or more computing devices 500. Note that the controller 60 can be implemented as part of a full-authority digital engine controls (FADEC) or other similar device, including electronic engine control (EEC), engine control unit (ECU), electronic propeller control, propeller control unit, and the like. In some embodiments, the controller 60 is implemented as a Flight Data Acquisition Storage and Transmission system, such as a FAST™ system. The controller 60 may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for de-priming the component described herein may be implemented in a high level procedural or object oriented programming or scripting language, or a combination thereof, to communicate with or assist in the operation of a computer system, for example the computing device 500. Alternatively, the methods and systems for de-priming the component may be implemented in assembly or machine language. The language may be a compiled or interpreted language. Program code for implementing the methods and systems for de-priming the component may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for *** may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
an oil system of the aircraft engine for distributing oil to a plurality of components, a component of the plurality of components containing a baseline volume of oil during normal operation, the baseline volume of the oil being greater than a maximum volume of the oil for compliance with fire resistance requirements, the oil system having:
an oil circuit hydraulically connecting the plurality of components to an oil source,
a de-priming port in the oil circuit, the de-priming port fluidly connected to a fluid source, the fluid source being at a pressure sufficient to overcome a pressure drop through the component to drain the component to a volume of oil less than the maximum volume of the oil to provide fire resistance when being subjected to a fire event, and
a valve hydraulically connected to the oil circuit at the de-priming port, the valve having a closed configuration preventing a fluid of the fluid source from entering the oil circuit and an open configuration permitting the fluid to enter the oil circuit via the de-priming port and through the valve, the valve movable from the closed configuration to the open configuration in response to the component being subjected to the fire event.

2. The aircraft engine of claim 1, wherein the de-priming port is located at a higher elevation than the component.

3. The aircraft engine of claim 2, wherein the fluid source corresponds to an enclosure of the aircraft engine containing air.

4. The aircraft engine of claim 1, wherein the fluid source is a tank containing a pressurized gas.

5. The aircraft engine of claim 1, wherein the fluid source is connected to a compressor section of the aircraft engine.

6. The aircraft engine of claim 1, wherein the valve is a thermostatic valve being in the closed configuration if a temperature of the oil is below a temperature threshold and in the open configuration if the temperature of the oil is above the temperature threshold, the temperature threshold being above a maximum operating temperature of the oil.

7. The aircraft engine of claim 1, wherein the valve is an actuated valve, a controller operatively connected to the actuated valve, the controller having a processing unit and a computer-readable medium operatively connected to the processing unit and having instructions stored thereon executable by the processing unit for:
receiving a signal indicative of a fire event; and
moving the actuated valve from the closed configuration to the open configuration.

8. The aircraft engine of claim 7, wherein computer-readable medium further contains instructions for:
receiving a second signal indicative that the aircraft engine is shut down, the moving of the actuated valve performed after the receiving of the second signal.

9. The aircraft engine of claim 7, wherein the receiving of the signal indicative of the fire event includes receiving the signal from a sensor, the signal indicative that a temperature proximate the component is above a temperature threshold.

10. The aircraft engine of claim 1, wherein the component is one or more of an air-cooled oil cooler, a fuel-oil heat exchanger, an actuator, and a generator.

11. A method of de-priming an aircraft engine component from a flammable fluid, comprising:
determining that the aircraft engine component is subjected to a fire event, the aircraft engine component containing a baseline volume of the flammable fluid, the baseline volume of the flammable fluid being greater than a maximum volume of the flammable fluid to provide fire resistance when being subjected to a fire event;
fluidly connecting the aircraft engine component with a fluid source being at a pressure sufficient to overcome a pressure drop through the aircraft engine component; and
draining a volume of the flammable fluid out of the aircraft engine component with the fluid source, the volume of the flammable fluid corresponding to at least a difference between the baseline volume of the flammable fluid and the maximum volume of the flammable fluid to provide fire resistance when being subjected to a fire event.

12. The method of claim 11, wherein the fluidly connecting of the aircraft engine component with the fluid source includes fluidly connecting the aircraft engine component with a de-priming port in a circuit hydraulically connected to the aircraft engine component.

13. The method of claim 12, wherein the fluidly connecting of the aircraft engine component with the depriming port includes fluidly connecting the aircraft engine component with the de-priming port being at a higher elevation than the aircraft engine component.

14. The method of claim 13, wherein the fluidly connecting of the aircraft engine component with the fluid source includes fluidly connecting the aircraft engine component with an enclosure of the aircraft engine, the enclosure containing a volume of air.

15. The method of claim 13, wherein the fluidly connecting of the aircraft engine component with the fluid source includes fluidly connecting the aircraft engine component with a compressor of the aircraft engine.

16. The method of claim 11, wherein the fluidly connecting of the aircraft engine component with the fluid source includes fluidly connecting the aircraft engine component with a tank containing a pressurized gas.

17. The method of claim 11, wherein the fluidly connecting of the aircraft engine component with the fluid source includes opening a valve thereby allowing the fluid to flow through the aircraft engine component.

18. The method of claim 17, wherein the valve is a thermostatic valve, the opening of the valve includes exposing the valve to a temperature above a temperature threshold, the temperature threshold being above a maximum operating temperature of the flammable fluid.

19. The method of claim 17, wherein the valve is an actuated valve, the opening of the valve includes:
receiving a signal indicative of the fire event; and
moving the actuated valve from a closed configuration to an open configuration.

20. The method of claim 19, comprising receiving a second signal indicative that the aircraft engine is shut down, the moving of the actuated valve performed after the receiving of the second signal.

* * * * *